United States Patent [19]
Doerge et al.

[11] 3,888,803
[45] June 10, 1975

[54] HIGH TEMPERATURE POLYURETHANE FOAMS

[75] Inventors: Herman P. Doerge, Oakmont; Charles G. Slater, New Kensington; Jerome A. Seiner, Pittsburgh, all of Pa.

[73] Assignee: PPG Industries, Inc., Pittsburgh, Pa.

[22] Filed: Jan. 4, 1974

[21] Appl. No.: 430,460

Related U.S. Application Data

[63] Continuation-in-part of Ser. No. 311,042, Nov. 30, 1972, abandoned.

[52] U.S. Cl. 260/2.5 AQ; 260/2.5 AF; 260/2.5 AM; 260/77.5 AQ
[51] Int. Cl. .................. C08g 22/16; C08g 22/44
[58] Field of Search .. 260/2.5 AM, 2.5 AQ, 2.5 AF, 260/77.5 AQ

[56] References Cited
UNITED STATES PATENTS

| | | | |
|---|---|---|---|
| 3,331,791 | 7/1967 | Cuscukida | 260/2.5 AQ |
| 3,459,671 | 8/1969 | Marklow | 260/2.5 AQ |
| 3,597,371 | 8/1971 | Britain | 260/2.5 AQ |

FOREIGN PATENTS OR APPLICATIONS

| | | | |
|---|---|---|---|
| 926,414 | 5/1963 | United Kingdom | 260/2.5 AQ |
| 967,359 | 8/1964 | United Kingdom | 260/2.5 AQ |
| 1,336,857 | 7/1963 | France | 260/2.5 AQ |

*Primary Examiner*—Donald E. Czaja
*Assistant Examiner*—C. Warren Ivy
*Attorney, Agent, or Firm*—Frank J. Troy

[57] ABSTRACT

This invention relates to polyurethane foams capable of high temperature service with relatively low thermal expansion or degradation. These polyurethane foams are prepared using an aminic polyol. The polyurethane foams are blown with a controlled amount of water and fluorohalocarbons.

9 Claims, No Drawings

HIGH TEMPERATURE POLYURETHANE FOAMS

CROSS-REFERENCE TO RELATED APPLICATIONS

This application is a continuation-in-part of application serial No. 311,042, filed Nov. 30, 1972, now abandoned.

BACKGROUND OF THE INVENTION

Various means exist to provide high temperature insulation used either to retain heat in or exclude heat from an environment. Polyurethane foams are relatively inexpensive when considered on the basis of their insulating value in the range of about 300° or even 200°F. for extended periods of time. However, polyurethane foams have some drawbacks in high temperature applications. These drawbacks include excessive thermal expansion, which is frequently followed by shrinkage or collapse with attendant loss of K factor.

DESCRIPTION OF THE INVENTION

It has now been found that polyurethane foams having good thermal stability, both dimensionally and as an insulator, can be formed from aminic polyols and an organic polyisocyanate, the foam being blown with controlled amounts of water and fluorohalocarbons.

By "aminic polyol" is meant a material containing two or more hydroxyl groups, at least one amine group, and an average of no more than one ether group per molecule. The aminic polyols useful in the instant invention are available either as items of commerce sold as polyhydroxy amines, or may be prepared by reacting ammonia, an organic amine (including mono-, di- and polyamines) or an amine group-containing alcohol (including mono-, di- and polyalcohols) with an alkylene oxide or mixture of alkylene oxides. The alkylene oxide or oxides are used either in a molar amount equal to the total number of hydrogen atoms attached to the nitrogen atom or atoms or in an amount of no more than one mole in excess of the total number of hydrogen atoms attached. In the first instance, an aminic polyol will be produced which contains no, or substantially no, ether groups per molecule; while in the latter instance, an aminic polyol is produced which contains an average of no more than one ether group per molecule.

The alkylene oxides used preferably are those containing from 2 to 4 carbon atoms, such as ethylene oxide, propylene oxide, epoxybutanes, and mixtures thereof.

The organic amines useful in producing the aminic polyols of the instant invention include methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, the hexanediamines, phenylenediamines, toluenediamines, naphthalenediamines, and the like.

The amine group-containing alcohols useful in producing the aminic polyols of the instant invention include mono-, di- and trialkanolamines, such as monoethanolamine, diethanolamine, triethanolamine, propanolamines, butanolamines, and the like.

As noted above, the aminic polyols of the instant invention can be produced by reacting ammonia, an organic amine or an amine group-containing alcohol with an alkylene oxide, or oxides, with the alkylene oxide or oxides used in a molar equal to the number of hydrogen atoms attached to the nitrogen atom or atoms. For example, triisopropanolamine may be formed by reacting one mole of ammonia with 3 moles of propylene oxide; penta(2-hydroxypropyl)diethylene triamine may be formed by the reaction of one mole of diethylene triamine with 5 moles of propylene oxide; and tetra(2-hydroxypropyl)ethylene diamine, also known as "Quadrol", may be formed by the reaction of one mole of ethylene diamine with 4 moles of propylene oxide.

The reaction between the ammonia, the organic amine or the amine group-containing alcohol and the alkylene oxide or oxides may also be controlled so as to produce an aminic polyol containing an average of no more than one ether group per molecule. For example, one mole of ammonia can be reacted with between 3 and 4 moles of an alkylene oxide; one mole of diethylene triamine can be reacted with between 5 and 6 moles of an alkylene oxide; and, one mole of monoethanolamine can be reacted with between 2 and 3 moles of an alkylene oxide. In each instance, an aminic polyol is produced which will contain on an average of up to one ether group per molecule.

Specific useful aminic polyols include diethanolamine, diisopropanolamine, monoethanol, diisopropanolamine, tributanolamine, penta(2-hydroxypropyl)-diethylene triamine, tetra(2-hydroxypropyl)ethylene diamine, triethanolamine, triisopropanolamine, alkylene oxide adducts as hereinbefore described, and the like.

The presently preferred aminic polyols include triisopropanolamine, penta(2-hydroxypropyl)diethylene triamine, and the adducts of ammonia, mono-, di- or triethanolamines or isopropanolamines with propylene oxide or ethylene oxide.

The aminic polyol may be a mixed aminic polyol, such as the polyol derived from reacting ethylene diamine with three moles of propylene oxide and one mole of ethylene oxide. Frequently the inclusion of ethylene oxide in the polyol molecule reduces the viscosity of the polyol in comparison with the equivalent amount of propylene oxide, thus rendering the polyol more suitable for spray foam application. Mixtures of aminic polyols can also be used.

It is preferable that the aminic polyol utilized to form the polyurethane foams of this invention be the sole polyol reactant; however, there may be incorporated in the foams of this invention no more than about 50 percent by weight and preferably no more than about 20 percent by weight, and most preferably no more than about 10 percent by weight of the total polyol (i.e., aminic polyol + other polyol) of any of the conventional polyols utilized in polyurethane foam formation. The presence of the additional polyol generally yields a less friable foam.

Where additional polyol is included in the compositions of the invention, the polyol is preferably an amine group-containing polyol containing an average of more than one ether group per molecule. One method of supplying such a polyol is to react ammonia, or amine, or an amino-containing alcohol with an excess of alkylene oxide over and above that necessary to form an aminic polyol containing one ether group per molecule. One such polyol is prepared by reacting ammonia with 4.5 moles of propylene oxide. Another such aminic polyol is the reaction of one mole of monoethanolamine with 4.65 moles of propylene oxide.

Other conventional polyols useful in combination with the aminic polyol or polyols include aliphatic polyols such as diols, aliphatic triols such as hexanetriol, and polyether polyols prepared by the oxyalkylation of said aliphatic polyols. It is preferred to use polyols of trifunctionality or higher. The aliphatic triols which may be used as an additional polyol component generally include aliphatic triols having 3 or more carbon atoms. Typical triols include the following: trimethylolethane, trimethylolpropane, glycerol, 1,2,6-hexanetriol and the like. The trifunctional polyether polyols useful in the preparation of the rigid polyurethane foams herein generally have a hydroxyl number in excess of about 200 and preferably should have a hydroxyl number in excess of about 300. It should be noted, however, that the hydroxyl number of the polyol used is not critical, but rather is dependent upon the final foam desired.

Tetrafunctional polyether polyols and polyether polyols of higher functionality are generally prepared by the reaction of an alkylene oxide, such as ethylene oxide, propylene oxide or butylene oxide, with a polyol having 4 or more available hydroxyl groups. Typical tetrafunctional and higher functional polyether polyols are prepared by the oxyalkylation of polyols such as the following: pentaerythritol, sucrose, 2,2,6,6-tetrakis(hydroxymethyl)cyclohexanol, glucose, sorbitol, mannitol, degraded starches, degraded cellulose, diglycerol, alpha-methyl glucoside and the like. When such polyether polyols are utilized in the novel rigid polyurethane foams of this invention, they should have a hydroxyl number in excess of about 200 and preferably in excess of about 250, with the best results generally achieved from those polyether polyols having hydroxyl numbers in excess of 300. Again, the hydroxyl number is not critical, but is dependent upon the final foam desired.

In addition to the aliphatic polyols and the polyether polyols, polyester polyols may be utilized along with the aminic polyol to prepare useful rigid polyurethane foams. Suitable polyester resins may be prepared by reacting an excess of polyol with a polycarboxylic acid, especially dicarboxylic acids. Typical polyols include: ethylene glycol, propylene glycol, butylene glycol, glycerol, trimethylolpropane, trimethylolethane, 1,2,6-hexanetriol, pentaerythritol, diethylene glycol, dipropylene glycol, and the like. Typical dicarboxylic acids include, adipic acid, succinic acid, azaleic acid, phthalic acid, isophthalic acid, terephthalic acid, chlorendic acid, tetrabromophthalic acid and the like, and the corresponding anhydrides where such anhydrides exist. Also long chain dimer acids may be used to form useful polyols by esterification with polyols, especially diols such as ethylene glycol and the like. For purposes of this invention, useful polyesters generally should have a hydroxyl number in excess of about 200, and preferably in excess of about 300. Again, the hydroxyl number is not critical, rather it is dependent upon the final foam desired.

Other materials which may be present in the novel urethane foams of this inventon include phenol-formaldehyde condensation products, castor oil and its derivatives and the oxyalkylation products of polyamine-polyamide compounds as obtained by the reaction of dicarboxylic acids with polyamines.

Organic polyisocyanates which are reacted with the polyols to form polyurethane foams include toluene diisocyanate, chlorophenyl-2,4-diisocyanate, ethylene diisocyanate, 1,4-tetramethylene diisocyanate, paraphenylene diisocyanate, hexamethylene diisocyanate, and the like. While the above diisocyanates may be reacted with the polyols to form foams, it is preferred to form prepolymers of said diisocyanates when they are to be used in rigid foam formulations.

When it is desired to form polyurethane foams directly from an organic polyisocyanate and the polyol without first preparing a prepolymer, it is preferred that polynuclear polyisocyanates of the following type be used: diphenyl diisocyanate, triphenyl diisocyanate, 3,3'-dimethyl-4,4'-biphenylene diisocyanate, 3,3'-dimethoxy-4,4'-biphenylene diisocyanate, polymethylene polyphenyl isocyanate, diphenylmethane-4,4'-diisocyanate, triphenyl methane triisocyanate, 1,5-naphthalene diisocyanate, 3,3'-dimethyldiphenylmethane-4,4'-diisocyanate, and the like. Of the preferred polyisocyanates, it has been found that the best results have generally been obtained when polyisocyanates having a functionality of greater than 2.0 are utilized. Exemplary polyisocyanates include the following: crude diphenylmthane-4,4'-diisocyanate, commonly referred to as crude MDI, having a functionality of about 2.5 to 2.6; crude tolylene diisocyanate, commonly referred to as crude TDI, containing about 85 percent TDI and about 15 percent polymeric isocyanate and having a functionality of about 2.1; polymethylene polyphenylisocyanate, commonly referred to as PAPI, having an isocyanate functionality greater than 2.4; and Mondur MR, having an isocyanate equivalent of 133 and a functionality of 2.6–2.8.

Furthermore, although solid organic polyisocyanates can be utilized in the instant invention by melting them prior to reaction with the other foam-forming ingredients, it is preferred that liquid organic polyisocyanates can be utilized.

The relative amount of organic isocyanate utilized in polyurethane foam formulations is susceptible to variation over a substantial range. Usually the isocyanate component is employed in an amount which provides approximately one reactive isocyanato group for each reactive hydrogen of the polyol component. However, some of the organic polyisocyanates tend to evaporate and it may be desirable to compensate for this loss. A range of about one-half equivalent to about two equivalents of organic polyisocyanate per equivalent of polyol component in the final material is ordinarily used, but smaller or larger amounts can be utilized with good results.

The foamable compositions of the invention are self-catalytic and typically do not require a catalyst to cure. If, however, a catalyst is desired to speed the ratio of the reaction, there may be included in the foamable mixture those catalysts known to promote polyurethane formation.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired. Many hundreds of these are available as commercial products. Some of these are listed in the publication DETERGENTS AND EMULSIFIERS—UP TO DATE, published by John W. McCutcheon, Inc., 475 Fifth Avenue, New York, N.Y.

Examples of surfactants which may be used include the so-called Pluronics, which have been described as being condensates of ethylene oxide with a hydrophobic base formed by condensing propylene oxide with propylene glycol.

Another class of surfactants comprises the so-called Tetronics, which are formed by the addition of propylene oxide to ethylene diamine, followed by the addition of ethylene oxide.

Another valuable class of surfactants comprises the so-called Tweens, which are described as the monoesters of higher fatty acids, represented by lauric acid, stearic acid and oleic acid, and polyoxyethylene sorbitan.

Another of the more satisfactory surfactants which has been found to effectively maintain the cell structure in the foaming and curing of polyurethane resins comprises soluble, liquid derivatives of silicones. One such material is sold as Dow-Corning 199. Still another highly useful silicon base surfactant comprises the so-called silicon L-52. Other surfactants, especially the liquid or soluble non-ionic ones, are also useful. The surfactants may be employed in amounts within the range of about 0.1 to about 3 percent by weight based upon the mixture of polyol component and the organic polyisocyanate component. In relatively dense foams, for example, those weighing about 5 or 6 pounds and upward per cubic foot, the surfactants may be omitted entirely.

To impart a foamed or cellular structure to the foamable mixture a suitable gassing agent or blowing agent or mixture thereof must be added. The polyurethane foams of this invention are prepared using a blowing agent which contains a controlled amount of water and a fluorohalocarbon.

The fluorohalocarbon employed in the foaming system may be any liquid or liquifiable but relatively volatile fluorohalocarbon, such as those containing one, two, or even up to four halocarbons. These include the following:

| | | |
|---|---|---|
| $CCl_3F$ | $C_2Cl_2F_4$ | $CClF_3$ |
| $CCl_2F_2$ | $CHCl_2F$ | $CHClF_2$ |

The halocarbons having one or two carbon atoms are preferred, and of these, trichloromonofluoromethane and dichlorodifluoromethane are particularly useful in commercial preparations. These are added to the blended polyolpolyisocyanate mixtures as liquids in quantities of about 0.1 percent to about 20 percent, and preferably from about 2 to about 10 percent by weight of the total system.

The water is generally used in amounts of from about 0.1 percent to about 3 percent by weight of the total system.

In addition, the water and fluorohalocarbon are utilized in a weight proportion of water-to-fluorohalocarbon of about 1:1 to about 1:20 and preferably in the range of about 1:2 to about 1:10.

The total amount of blowing agent employed in the composition is dependent upon the desired density of the final product, but in any event should not exceed about 25 percent by weight of the total system.

In general, the compositions of the instant invention are heat aged in a manner well known in the art at temperatures of less than about 400°F., and preferably less than about 350°F. and, most preferably, from about 200° to about 300°F.

Illustrating the invention are the following examples, which, however, are not to be construed as limiting the invention to their details. All parts and percentages in the examples, as well as throughout the specification, are by weight unless otherwise indicated.

EXAMPLE A

An aminic polyol was prepared by charging 109.9 parts of monoethanolamine into a pressure reactor after a nitrogen purge. Propylene oxide was then added at a reaction temperature of 200°–240°F. with a maximum pressure of 50 p.s.i.g., maintaining temperature and pressure until 240 parts had been added. After the addition was complete, the reaction mixture was held at 238°F. for 1 hour.

The reaction product was vacuum stripped and filtered.

EXAMPLE B

An aminic polyol (the adduct of ethylene diamine with three moles of propylene oxide and one mole of ethylene oxide, was prepared by charging a pressure reactor with 86.3 parts of ethylene diamine. After a nitrogen purge there was added at a reaction temperature of 220°–240°F., 250.3 parts of propylene oxide at 0–40 p.s.i.g. When addition was complete, the reaction mixture was held at 230°F. The mixture was then cooled to 200°F. and 63.3 parts of ethylene oxide were added at 200°–230°F. at 0–50 p.s.i.g. After the addition was completed, the mixture was held for 1 hour at 220°F. The reaction was cooled to 150°F., drained and the product vacuum stripped and filtered.

EXAMPLE C

An aminic polyol (the adduct of diethylene triamine and 5 moles of propylene oxide) was prepared by charging a pressure reactor with 969 parts of diethylene triamine. After a nitrogen purge, there was added at a reaction temperature of 210°–250°F., 2781 parts of propylene oxide at 0–35 p.s.i.g. The reaction mixture was held at temperature until the pressure dropped. The reaction product was drained from the reactor, and was then stripped and filtered.

EXAMPLE I

Polyurethane foams were prepared in a conventional manner from a polyisocyanate and a masterbatch containing the aminic polyol of Example A and were heat aged at 300°F., their performance varied with the ratio of water to halocarbon blowing agent employed. Foams Nos. 10 and 11 were controls, where either the fluorohalocarbon or the water was omitted.

TABLE I

| Crude MDI (Parts) | FOAM | | | | | | | | | | | |
|---|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 | No. 12 |
| | 119 | 119 | 120 | 135 | 138 | 140 | 155 | 157 | 159 | 157.5 | 105 | 140 |
| Polyol of Example A | 48 | 48 | 48 | 48 | 48 | 48 | 48 | 48 | 48 | 48 | 48 | 48 |
| Silicone surfactant (parts) | 1 | 1 | 1 | 1 | 1 | 1 | 1.1 | 1.1 | 1.2 | 1.5 | 1 | 1 |
| 80% Dimethylethanolamine, 20% Dabco | 0 | 0 | 0 | 0 | 0 | 0 | 0 | 0 | 0 | 0 | 0.4 | 0 |

TABLE I-Continued

| Crude MDI (Parts) | No. 1 119 | No. 2 119 | No. 3 120 | No. 4 135 | No. 5 138 | FOAM No. 6 140 | No. 7 155 | No. 8 157 | No. 9 159 | No. 10 157.5 | No. 11 105 | No. 12 140 |
|---|---|---|---|---|---|---|---|---|---|---|---|---|
| Monofluorotrichloromethane (parts) | 3.5 | 9.0 | 15.0 | 3.8 | 10.0 | 16.7 | 4.3 | 11.0 | 18.5 | 0 | 26.0 | 10.1 |
| Water (parts) | 0.9 | 0.9 | 0.95 | 2.0 | 2.1 | 2.2 | 3.2 | 3.3 | 3.5 | 3.3 | 0 | 2.1 |
| NCO/OH equivalent | 1.05 | 1.05 | 1.05 | 1.05 | 1.05 | 1.05 | 1.05 | 1.05 | 1.05 | 1.05 | 1.05 | 1.05 |
| $H_2O/Cl_3FC$ ratio | 1/3.9 | 1/10 | 1/16.1 | 1/1.9 | 1/4.8 | 1/7.6 | 1/1.36 | 1/3.3 | 1/5.3 | All $H_2O$ | All $CL_3FC$ | 1/4.8 |
| Percent $H_2O$ | 0.52 | 0.50 | 0.50 | 1.05 | 1.05 | 1.05 | 1.51 | 1.50 | 1.52 | 1.57 | 0 | 1.05 |
| Percent $Cl_3FC$ | 2.02 | 5.02 | 8.05 | 2.00 | 5.02 | 8.05 | 2.04 | 5.00 | 8.05 | 0 | 14.4 | 5.02 |
| Density (lbs./ft.³) | 4.01 | 2.83 | 2.12 | 2.49 | 2.0 | 1.70 | 1.79 | 1.61 | 1.33 | 1.76 | 1.71 | 2.03 |
| Percent volume change-one hour | −.37 | −.24 | 0 | −.72 | −.48 | −.36 | −1.1 | −.98 | −.12 | — | — | +0.48 |
| Percent weight loss-one hour | 1.64 | 1.13 | 2.16 | 3.14 | 2.53 | 2.17 | 2.88 | 2.04 | 2.11 | — | — | 1.60 |
| Percent volume change-two hours | −.62 | −.36 | −.24 | −1.09 | −.85 | −.12 | −1.22 | −1.22 | +.49 | −5.0 | +7.3 | +0.49 |
| Percent weight loss-two hours | 2.22 | 1.78 | 2.16 | 3.33 | 2.53 | 2.17 | 3.66 | 2.32 | 2.81 | 2.03 | 0.3 | 1.60 |
| Percent volume change-24 hrs. | −2.33 | +0.24 | +0.72 | −5.07 | −0.97 | +2.17 | −4.65 | +0.37 | +3.30 | −11.1 | +41.0 | −0.12 |
| Percent weight loss-24 hrs. | 3.26 | 2.92 | 4.32 | 4.81 | 2.75 | 2.45 | 3.92 | 4.35 | 5.96 | 2.5 | 6.46 | 3.66 |
| Percent volume change-one week | −5.01 | +8.53 | +16.58 | −7.24 | +7.72 | +12.93 | −6.60 | +0.49 | −1.35 | −20.6 | +21.6 | +1.47 |
| Percent weight loss-1 week | 6.87 | 10.46 | 16.42 | 9.80 | 12.64 | 11.94 | 9.66 | 11.85 | 13.33 | 9.4 | 20.2 | 10.28 |
| Percent volume change-one month | −5.98 | +5.41 | +1.80 | −11.8 | +5.07 | +4.11 | −14.06 | −6.82 | −15.16 | — | — | +1.95 |
| Percent weight loss-one month | 15.37 | 19.74 | 23.76 | 17.38 | 16.77 | 21.19 | 17.50 | 19.35 | 21.40 | — | — | 16.67 |

EXAMPLE II

Polyurethane foams were prepared in a conventional manner from the aminic polyol of Example B and heat aged at 300° and 350°F.

TABLE II

| | Foam No. 13 (Heat aged at 300°F.) | Foam No. 14 (Heat aged at 350°F.) |
|---|---|---|
| Polyol of Example B (parts) | 50 | 50 |
| Mondur MR (parts) | 137 | 137 |
| Silicone surfactant (parts) | 1.5 | 1.5 |
| $Cl_3FC$ (parts) | 12.0 | 12.0 |
| Water (parts) | 2.4 | 2.4 |
| NCO/OH index | 1.05 | 1.05 |
| $H_2O/Cl_3FC$ ratio | 1/5 | 1/5 |
| Percent $H_2O$ | 1.18 | 1.18 |
| Percent $Cl_3FC$ | 5.90 | 5.90 |
| Density | 1.73 | 1.73 |
| % volume change — 1 hour | +0.75 | +0.62 |
| % weight loss — 1 hour | 1.65 | 2.47 |
| % volume change — 24 hours | −0.13 | +6.13 |
| % weight loss — 24 hours | 3.56 | 14.51 |
| % volume change — 1 week | +7.07 | −6.50 |
| % weight loss — 1 week | 10.41 | 21.1 |
| % volume change — 2 weeks | +8.19 | −11.60 |
| % weight loss — 2 weeks | 12.33 | 23.56 |
| % volume change — 4 weeks | +10.31 | −17.47 |
| % weight loss — 4 weeks | 17.26 | 27.12 |

EXAMPLE III

A polyurethane foam was prepared from the aminic polyol of Example A and compared with a control, an aminic polyether polyol which is the reaction product of triethanolamine and propylene oxide, as described in Example I of U.S. Pat. No. 3,655,588 (viscosity 400 centipoises and hydroxyl value of 498) and heat aged at 250°F.

TABLE III

| | Foam No. 15 | | Foam No. 16 | |
|---|---|---|---|---|
| PAPI 500 | 150.0 | | 131.0 | |
| Polyol of Example A | 48.0 | | — | |
| Control polyol | — | | 69.0 | |
| Silicone surfactant | 1.0 | | 1.1 | |
| Catalyst - 80% dimethyl ethanolamine and 20% 1,4-diazo[2,2,2]bicyclo-octane (triethylene diamine) | 0.1 | | — | |
| $Cl_3FC$ | 10.0 | | 10.5 | |
| Water | 2.2 | | 2.2 | |
| $H_2O/Cl_3FC$ | 1/4.55 | | 1/4.77 | |
| Density | 2.04 | | 1.83 | |
| | % Wt. Loss | % Vol. Change | % Wt. Loss | % Vol. Change |
| 1 Hour | 1.80 | +0.36 | 3.18 | −1.40 |
| 2 Hours | 2.46 | +0.24 | 3.43 | −1.53 |
| 24 Hours | 3.84 | +0.36 | 3.43 | −2.00 |
| 72 Hours | 3.84 | +1.08 | — | — |
| 1 Week | 4.97 | +0.84 | 2.94 | +9.61 |
| 2 Weeks | 4.97 | +1.20 | 3.91 | +13.36 |
| 4 Weeks | 6.77 | +1.45 | 7.58 | +34.35 |
| 3 Months | 8.35 | −0.97 | 8.80 | +29.07 |

The foams of the invention are particularly useful as a thermal barrier or where at least a portion of the foam is subjected to substantial periods of service at or above about 200°F. or even at or above about 300° or even 350°F.

Other polyols, isocyanates and modifying polyol and other conventional foam adjuvants, such as those described hereinabove may be substituted for those exemplified and results within the scope of this description are obtainable.

According to the provisions of the Patent Statutes, there are described above the invention and what are now considered its best embodiments. However, within the scope of the appended claims, it is to be understood that the invention can be practiced otherwise than as specifically described.

We claim:

1. A cellular rigid polyurethane resin displaying improved thermal stability, prepared from a mixture comprising:
   A. an aminic polyol, said aminic polyol containing two or more hydroxyl groups, at least one amine group, and an average of no more than one ether group per molecule, said aminic polyol being the adduct of (1) a member selected from the group consisting of ammonia, diethylene triamine, ethylene diamine, mono-, di- or tri- alkanolamines and (2) an alkylene oxide or mixture of alkylene oxides;
   B. an organic polyisocyanate; and
   C. a cellulating system comprising a mixture of water and a fluorohalocarbon wherein the weight ratio of water to fluorohalocarbon is between about 1:1 and about 1:20.

2. A cellular polyurethane as in claim 1 wherein the organic polyisocyanate (B) is an organic polyisocyanate having a functionality greater than 2.0 and the fluorohalocarbon is trichloromonofluoromethane.

3. A cellular polyurethane as in claim 2 wherein the ratio of water to trichloromonofluoromethane is between about 1:2 and about 1:10.

4. A cellular polyurethane as in claim 2 wherein the mixture contains, in addition to the aminic polyol, up to about 50 percent by weight of the total polyol of another polyol.

5. A cellular polyurethane as in claim 4 wherein the ratio of water to trichloromonofluoromethane is between about 1:2 and about 1:10.

6. A cellular polyurethane as in claim 2 wherein the polyol (A) is selected from the group consisting of triisopropanolamine; penta(2-hydroxypropyl)diethylene triamine; tetra(2-hydroxypropyl)ethylene diamine and adducts of ammonia, mono-, di- or tri- ethanolamine or isopropanolamine and ethylene oxide or propylene oxide.

7. A cellular polyurethane as in claim 6 wherein the ratio of water to trichloromonofluoromethane is between about 1:2 and about 1:10.

8. A cellular polyurethane as in claim 6 wherein the mixture contains, in addition to the amine polyol, up to about 50 percent by weight of the total polyol of another polyol.

9. A cellular polyurethane as in claim 7 wherein the ratio of water to trichloromonofluoromethane is between about 1:2 and about 1:10.

* * * * *